United States Patent
Fukumoto et al.

(10) Patent No.: US 7,630,833 B2
(45) Date of Patent: Dec. 8, 2009

(54) MAP DISPLAY DEVICE AND MAP DISPLAY METHOD

(75) Inventors: Motohiro Fukumoto, Nagoya (JP); Akihito Fujiwara, Tokyo (JP); Yasuhiro Hayashida, Tokyo (JP)

(73) Assignees: DENSO Corporation, Kariya (JP); Sega Corporation, Tokyo (JP)

( * ) Notice: Subject to any disclaimer, the term of this patent is extended or adjusted under 35 U.S.C. 154(b) by 0 days.

(21) Appl. No.: 11/507,656

(22) Filed: Aug. 22, 2006

(65) Prior Publication Data
US 2007/0067103 A1    Mar. 22, 2007

(30) Foreign Application Priority Data
Aug. 26, 2005    (JP)    ............... 2005-246246

(51) Int. Cl.
G01C 21/30    (2006.01)
G01C 21/32    (2006.01)

(52) U.S. Cl. .................. 701/211; 701/200; 701/201; 701/208; 701/209; 701/213; 340/988; 340/990; 340/995.1; 340/995.14; 340/995.15; 340/995.16; 340/995.17; 340/995.18

(58) Field of Classification Search ......... 701/200–225; 340/988–996
See application file for complete search history.

(56) References Cited

U.S. PATENT DOCUMENTS

| | | | | |
|---|---|---|---|---|
| 5,331,563 | A * | 7/1994 | Masumoto et al. | 701/207 |
| 5,874,905 | A * | 2/1999 | Nanba et al. | 340/995.2 |
| 6,011,494 | A * | 1/2000 | Watanabe et al. | 340/995.14 |
| 6,356,840 | B2 * | 3/2002 | Kusama | 701/211 |
| 6,388,664 | B2 * | 5/2002 | Sone | 345/428 |
| 6,397,145 | B1 * | 5/2002 | Millington | 701/211 |
| 6,452,544 | B1 * | 9/2002 | Hakala et al. | 342/357.13 |
| 6,756,919 | B2 * | 6/2004 | Endo et al. | 340/995.14 |
| 6,862,501 | B2 * | 3/2005 | He | 701/3 |
| 6,885,939 | B2 * | 4/2005 | Schmidt et al. | 701/211 |
| 7,031,830 | B2 * | 4/2006 | Kokojima et al. | 701/209 |
| 7,216,035 | B2 * | 5/2007 | Hortner et al. | 701/211 |
| 2004/0128070 | A1 * | 7/2004 | Schmidt et al. | 701/211 |
| 2004/0139080 | A1 * | 7/2004 | Schmidt et al. | 707/100 |

FOREIGN PATENT DOCUMENTS

| | | | |
|---|---|---|---|
| JP | 09237034 | * | 9/1997 |
| JP | A-H09-237034 | | 9/1997 |
| JP | A-2000-67384 | | 3/2000 |
| JP | A-2000-74678 | | 3/2000 |
| JP | A-2001-027532 | | 1/2001 |
| JP | A-2001-324347 | | 11/2001 |
| JP | A-2004-45185 | | 2/2004 |
| JP | A-2005-265641 | | 9/2005 |

OTHER PUBLICATIONS

JP 09-237034 Machine translation from JPO.*

* cited by examiner

*Primary Examiner*—Khoi Tran
*Assistant Examiner*—Bhavesh V Amin
(74) *Attorney, Agent, or Firm*—Posz Law Group, PLC

(57) ABSTRACT

In a map display device, a viewing angle for a three-dimensional road map can be changed horizontally on a screen so that the three-dimensional road map is generated at a standard viewing angle (45°) up to a wide viewing angle (90°). At this time, the viewing angle is changed based on a reference line passing through a current position of a subject vehicle where the map display device is mounted.

10 Claims, 5 Drawing Sheets

45 DEGREES (STANDARD)

PP

90 DEGREES (WIDE)

MAP DISPLAY DEVICE AND MAP DISPLAY METHOD

CROSS REFERENCE TO RELATED APPLICATIONS

This application is based on and incorporates herein by reference Japanese Patent Application No. 2005-246246 filed on Aug. 26, 2005.

FIELD OF THE INVENTION

The present invention relates to a map display device, a map display method, a map display program, and a recording medium to record the same program.

BACKGROUND OF THE INVENTION

Conventionally, there is proposed a map display device that displays three-dimensional map images (e.g., see patent document 1). The map display device disclosed in patent document 1 uses an automatically configured initial value or a user-specified value to calculate the most recent viewpoint altitude. The viewpoint altitude indicates an altitude resulting from adding an additional altitude to the current altitude. The additional altitude indicates a difference between the current altitude and a previously calculated altitude. The map display device adds the additional altitude to the most recent viewpoint altitude to determine a viewpoint altitude for rendering a three-dimensional map image. The map display device renders a three-dimensional map image using the determined viewpoint altitude.

Patent document 1: JP-3250554 B2 (JP-2001-27532 A)

The above-mentioned conventional technology can extend the range of displaying a three-dimensional map image by, for example, changing the map image scale or increasing the viewpoint altitude. In this case, however, display contents near a subject vehicle where the map display device is mounted are also reduced. It is impossible to prevent the display contents near the subject vehicle from being reduced while extending the display range.

SUMMARY OF THE INVENTION

The present invention has been made in consideration of the foregoing. It is therefore an object of the present invention to provide a map display device, a map display method, a map display program, and a recording medium to record the same program capable of extending a display range and keeping a high level of visibility for display contents near a subject vehicle.

According to an aspect of the present invention, a map display device is provided with the following. Displayable range determination means is included for determining a displayable range of a road map based on a reference point settled on the road map. Display control means is included for displaying a three-dimensional road map on a screen, the three-dimensional road map being generated by applying a coordinate conversion process to a road map belonging to the displayable range. Viewing angle change means is included for changing a viewing angle for a three-dimensional road map displayed on the screen based on the reference point.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment of the present invention will be described in further detail with reference to the accompanying drawings. The embodiment describes an example of realizing the map display device according to the invention as one function of a car navigation apparatus.

The invention can be embodied not only as one function of the car navigation apparatus. The invention can be also embodied by installing a program for implementing functions of the invention into, for example, other vehicle-mounted terminals, mobile phones, PDAs (Personal Digital Assistants), PCs (Personal Computers), and the like.

Figure 1:
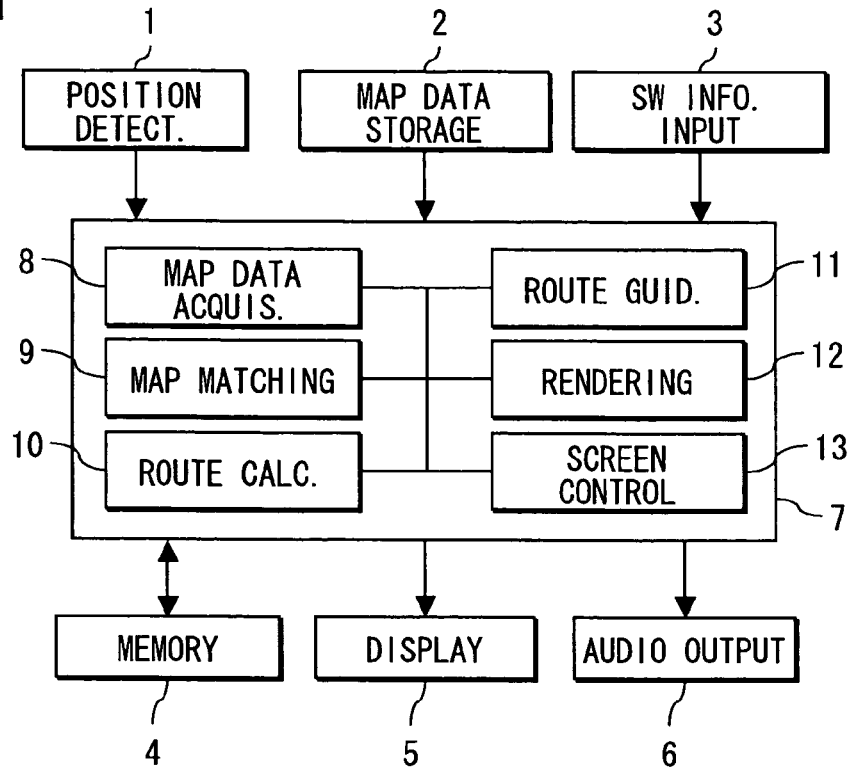
FIG. 1 is a block diagram showing an overall construction of a car navigation apparatus.

FIG. 1 schematically shows the overall construction of the car navigation apparatus. In FIG. 1, a position detection unit 1 is composed of a GPS (Global Positioning System) receiver, a direction sensor, a gyro sensor, and a vehicle speed sensor (not shown). The position detection unit 1 calculates information about a vehicle's current position. Since the respective sensors have errors with different characteristics, the position detection unit 1 is constructed to correct these errors. When the current position is calculated, all of these sensors need not to be provided. Only one or more of these sensors may need to be provided.

A map data storage unit 2 supplies various data including so-called map matching data for improving position detection accuracy, map data, and purpose data. The map data storage unit 2 is composed of a DVD player, a CD player, or a hard disk unit, for example.

A switch information input unit 3 provides switches attached to the left and right and the top and bottom of a display unit, for example. The switch information input unit 3 includes a viewing angle change switch (not shown) to change the viewing angle for a three-dimensionally rendered three-dimensional road map. Operating the viewing angle change switch allows the switch information input unit 3 to output viewing angle information corresponding to the operation. In this manner, a user can enter any intended viewing angle.

A memory unit 4 includes ROM and RAM (not shown). The memory unit 4 temporarily stores a navigation program, program's work memory, map data acquired from the map data storage unit 2, and the like.

A display unit 5 displays maps and destination selection screens for navigation. A screen of the display unit 5 displays the vehicle's current position mark supplied from the position detection unit 1 and a road map created based on map data supplied from the map data storage unit 2. Further, the road map is overlaid with display information such as a guiding route indicating a route to a destination text, and marks for pointing to positions of facilities on the road map. An audio output unit 6 generates speech for route guidance or explanation of screen operations.

A control unit 7 executes a route guidance function. This function automatically selects an optimum route from the current position to a destination in accordance with operations of the switch information input unit 3 and forms and displays a guiding route. In addition, the control unit 7 performs a map matching process, calculates guidance speech, and renders a map. The Dijkstra algorithm is a well-known technique of automatically settling an optimum route as mentioned above.

The control unit 7 is actually composed of a microcomputer. The control unit 7 provides means for achieving a variety of functions and is composed of a map data acquisition unit 8, a map matching unit 9, a route calculation unit 10, a route guidance unit 11, a rendering unit 12, and a screen control unit 13.

A map matching unit 9 determines on which road the current position is situated using current position information detected by the position detection unit 1, road shape data in the map data read from the map data storage unit 2, and the like. A user uses the switch information input unit 3 for operations such as displaying an intended map to settle a destination. A route calculation unit 10 calculates a route between information about the current position calculated by the map matching unit 9 or a user-specified start point and the destination.

A route guidance unit 11 calculates points needed for the guidance based on the result of the above-mentioned route calculation, road shape data stored in the map data, and position information about intersections and railway crossings. Further, the route guidance unit 11 determines which guidance is needed (e.g., right or left turn).

In accordance with an instruction from the screen control unit 13, the rendering unit 12 renders a map corresponding to the current position, a rough map of an express highway, and an magnified view of vicinity of an intersection. The rendering unit 12 stores the rendered images in frame memory (e.g., VRAM) for storing images displayed on the display unit 5.

In this case, the rendering unit 12 settles a reference point on the map data (road map) based on the current position information from the position detection unit 1. The rendering unit 12 determines a displayable range of the map data based on a sight line direction from the settled reference point, a predetermined viewpoint altitude, and an initial viewing angle.

Figure 2:
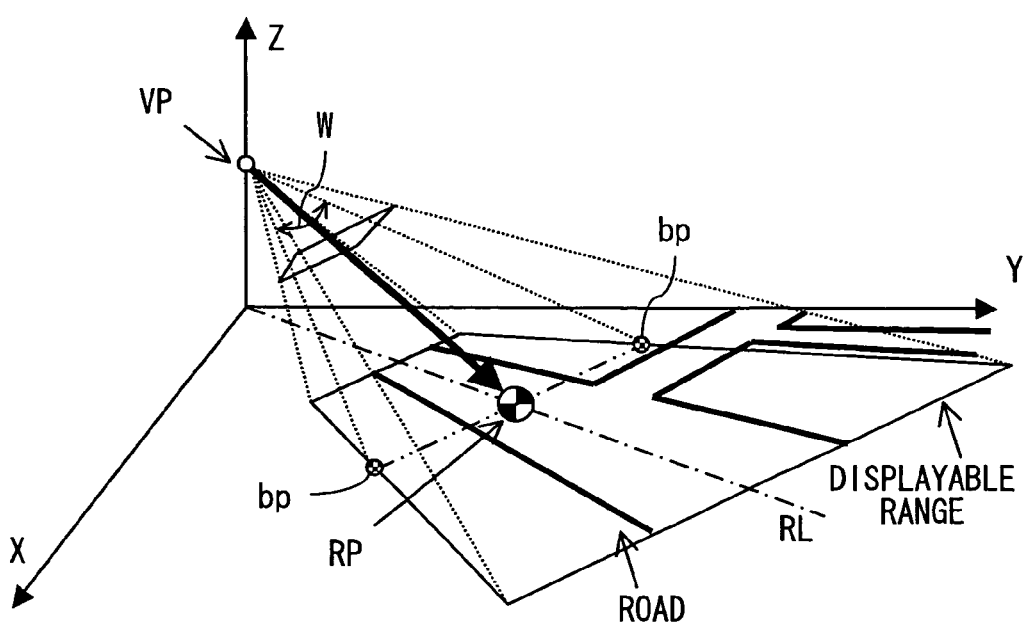
FIG. 2 is a perspective view showing a reference point (RP), a reference line (RL), a viewpoint (VP), and a viewing angle (W) in a virtual three-dimensional space (XYZ coordinate system)

FIG. 2 is a perspective view showing an example of settling a reference point (RP), a reference line (RL), a viewpoint (VP), and a viewing angle (W) in a virtual three-dimensional space (XYZ coordinate system). As shown in FIG. 2, the reference point is settled on a road map belonging to a two-dimensional plane (XY coordinate system). The positional relationship between the predetermined viewpoint and the reference point determines a reference line indicating a sight line direction.

The viewing angle is formed by viewing the reference point from the viewpoint and specifies the vertical breadth and the horizontal breadth of a viewing range (i.e., displayable range). For example, FIG. 2 uses a horizontal viewing angle (W) in the displayable range. At this time, a boundary position (bp) horizontally defined in the displayable range is settled to a position equivalent to the viewing angle (W) on a line orthogonal to the reference line. Changing the viewing angle (W) moves the boundary position (bp) horizontally defined in the displayable range on a line orthogonal to the reference line.

The reference point is approximately centered to the displayable range. The reference point is settled to roads and the like in the map data (road map). That is, the reference point is settled on a road where the subject vehicle is positioned, or on or near a road included in the route to the destination. In this manner, the reference point for changing the viewing angle is settled on a road where the subject vehicle is positioned, or on or near a road included in the route to the destination.

The rendering unit 12 determines the displayable range. Further, the rendering unit 12 calculates a coordinate conversion parameter needed to display a three-dimensional road map. In addition, the rendering unit 12 reads a specified range of map data including the determined displayable range from the map data storage unit 2. It should be noted that it is unnecessary to read part of the map data overlapping with the data already displayed on the screen. The rendering unit 12 reads only map data that is needed anew.

Figure 4A:
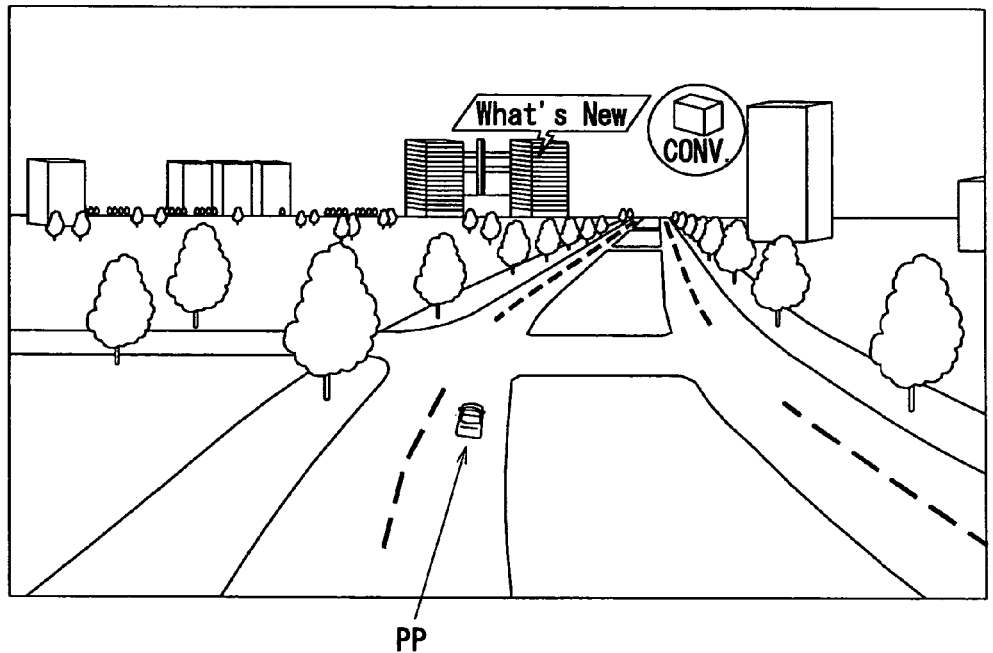
FIG. 4A shows a three-dimensional road map with the standard viewing angle (W=45°)

Using the coordinate conversion parameter, the rendering unit 12 converts the acquired map data into three-dimensional image data in terms of coordinates. The rendering unit 12 allows the display unit 5 to display the coordinate-converted map data in a bird's-eye view as exemplified in FIG. 4A. FIG. 4A shows a three-dimensional road map with the standard viewing angle (W=45 degrees) specified as an initial value. In FIG. 4A, a figure pointed by reference symbol PP indicates the subject vehicle's current position.

The map data acquisition unit 8 acquires map data needed for the above-mentioned processing units from the map data storage unit 2 and supplies the map data to the processing units. The above-mentioned processes are performed based on a program stored in the ROM of the memory unit 4 while data is transferred to and from the RAM.

Based on the information calculated by the route guidance unit 11, the control unit 7 allows the rendering unit 12 to render an associated image when the vehicle reaches a point to be guided. Further, the control unit 7 allows the audio output unit 6 to output specified speech so as to guide a user to the destination.

The car navigation apparatus according to the embodiment can change the viewing angle for the three-dimensional road map as shown in FIG. 4A based on the reference point. According to a well-known technology, for example, the display range of a three-dimensional road map can be widened by changing the road map scale or increasing the viewpoint altitude. In this case, however, the display contents near the vehicle are also reduced. There has been a demand for widening the display range and preventing the display contents near the vehicle from being reduced.

Figure 4B:
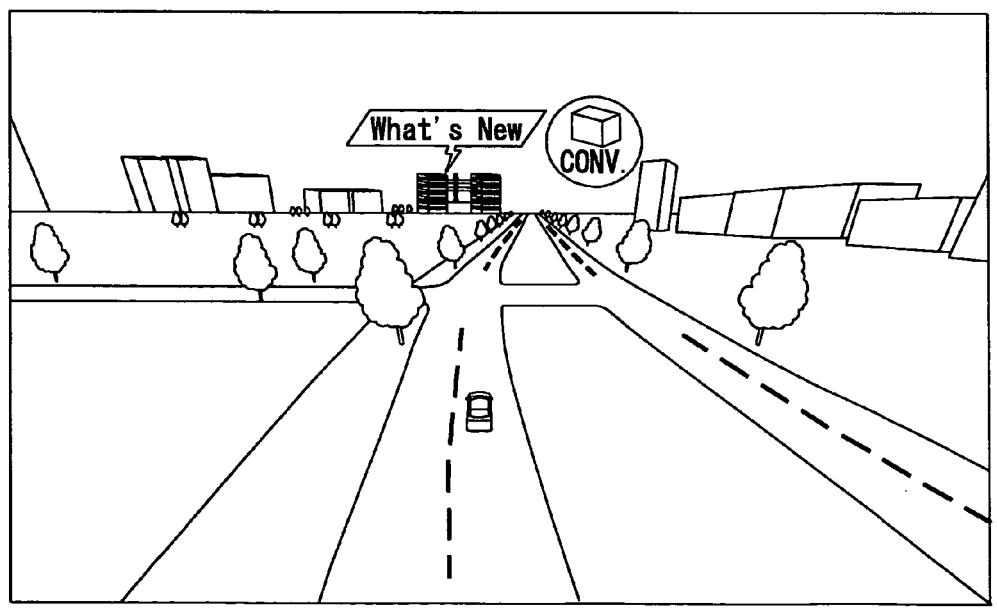
FIG. 4B shows a three-dimensional road map with a wide viewing angle (W=90°)

According to the embodiment, the reference point is settled on a road corresponding to the subject vehicle's current position PP, or on or near a road included in the route to the destination. Based on the reference point as shown in FIGS. 4A and 4B, the car navigation apparatus according to the embodiment can change the viewing angle for a three-dimensional road map horizontally on the screen.

Figure 3A:
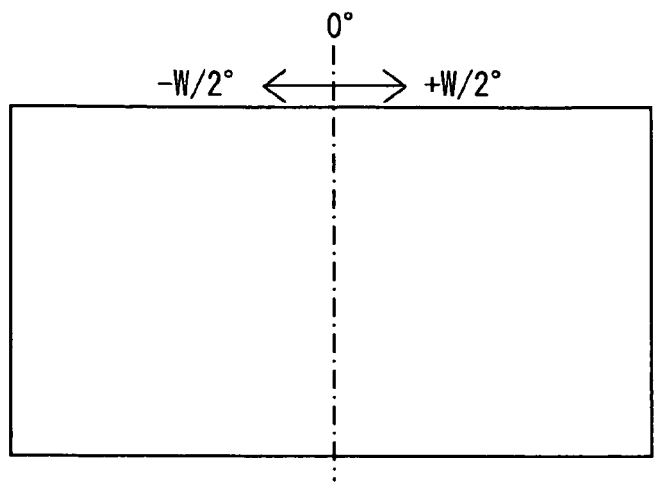
FIG. 3A diagramatically shows changing the viewing angle (W) in left and right directions against a reference line (0°) on a screen for displaying a three-dimensional road map.

As shown in FIG. 3A, the car navigation apparatus changes the horizontal viewing angle (W) for the three-dimensional road map on the screen based on the reference line (0°). The reference line is drawn vertically on the screen and passes through the reference point. The rendering unit 12 of the control unit 7 performs a process to change the viewing angle. The viewing angle information determines the above-mentioned displayable range according to the rendering unit 12 output from the switch information input unit 3 so as to display a three-dimensional road map equivalent to the viewing angle the user wishes.

Figure 3B:
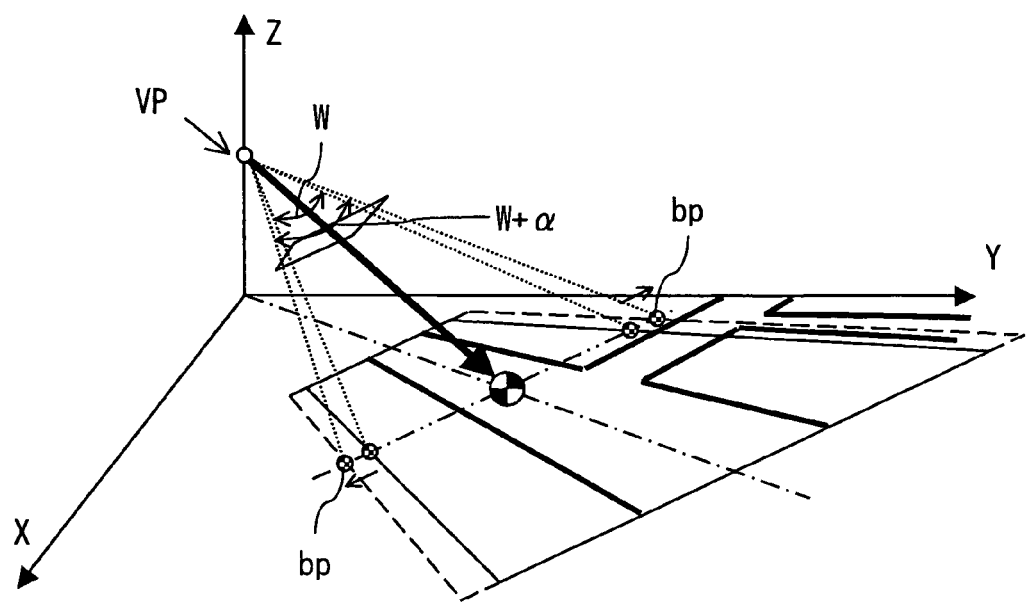
FIG. 3B shows how a displayable range changes in accordance with changing the viewing angle (W) to (W+α) in left and right directions on the screen.

FIG. 3B shows how the displayable range changes when the horizontal viewing angle (W) on the screen is changed to (W+α). As mentioned above, changing the viewing angle (W) moves the boundary position (bp) horizontally defined in the displayable range on a line orthogonal to the reference line. When the horizontal viewing angle (W) on the screen is changed to (W+α), the displayable range changes to widen horizontally in accordance with the changed viewing angle.

The rendering unit 12 determines the displayable range so that the screen displays a three-dimensional road map with the viewing angle corresponding to attributes of a road where the reference point is settled. The road attributes include a road type, road width, the number of lanes, and the like.

When the road type is general road, for example, the rendering unit 12 changes the viewing angle so as to be larger than that for the road type of express highway. When the road type is express highway, the rendering unit 12 changes the viewing angle so as to be smaller than that for the road type of general road.

When the road type is general road, the rendering unit 12 changes the viewing angle so as to be larger than that for the road type of express highway. In this manner, it is possible to widely display the vicinity of the general road. When the road type is express highway, the rendering unit 12 changes the viewing angle so as to be smaller than that for the road type of general road. It is possible to hide information unnecessary for traveling on the express highway.

As the road width increases, the viewing angle increases. As the road width decreases, the viewing angle decreases. In this manner, increasing the viewing angle for a large road width can prevent only the road from being displayed and prevent the vicinity of the road from being hidden. On the other hand, decreasing the viewing angle for a small road width hides unnecessary vicinity of the road.

As the number of lanes increases, the viewing angle increases. As the number of lanes decreases, the viewing angle decreases. In this manner, increasing the viewing angle for a large number of lanes can prevent the vicinity of the road from being hidden and prevent only the road from being displayed. On the other hand, decreasing the viewing angle for a small number of lanes hides unnecessary vicinity of the road.

Figure 5:
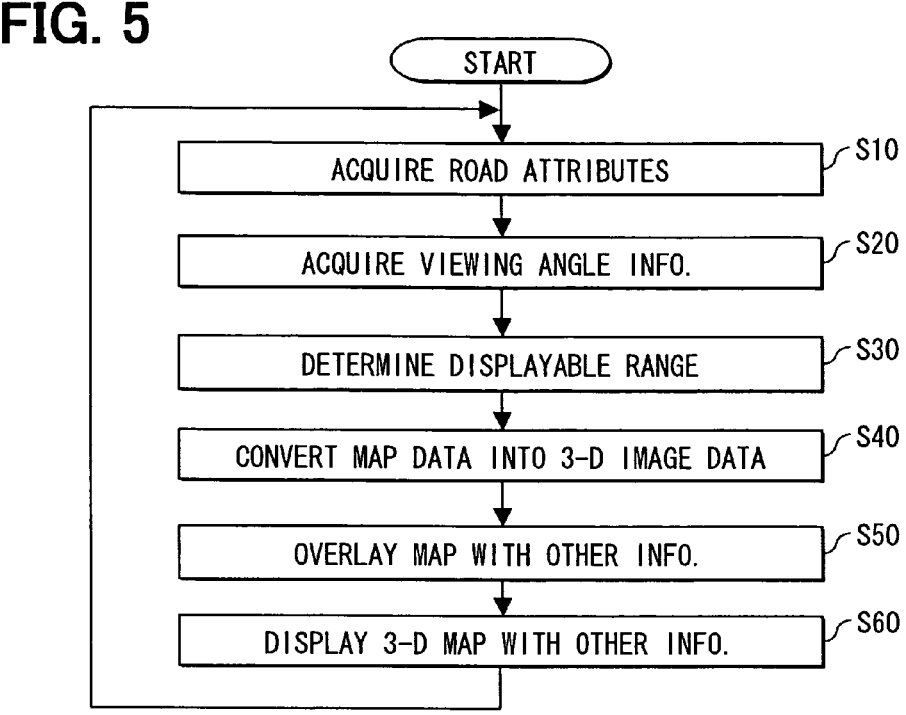
FIG. 5 is a flowchart showing a flow of a viewing angle change process.

With reference to a flowchart in FIG. 5, the following describes a process performed by the car navigation apparatus to change the viewing angle in a three-dimensional road map. At Step S10, the process acquires attributes (road type, road width, and the number of lanes) of a road assigned with the reference point from the map data storage unit 2.

At Step S20, the process acquires viewing angle information supplied from the switch information input unit 3. At Step S30, the process determines a displayable range of the road map equivalent to a viewing angle to be changed. To determine the viewing angle to be changed, the embodiment gives priority to viewing angle information by a user operation acquired at Step S20 over the road attribute acquired at Step S10. However, the method of setting the priority is not limited thereto. It may be preferable to prioritize the road attributes acquired at Step S10 so that a prioritized road attribute is preferentially used for determining the viewing angle to be changed. Further, a user may be allowed to change the priority setting as needed.

At Step S40, the process reads map data containing the displayable range determined at Step S30 from the map data storage unit 2. The process converts the read map data into three-dimensional image data in terms of coordinates.

At Step S50, the process overlays the three-dimensional road map resulting from the coordinate conversion with character display information to be displayed on the road map, mark display information to indicate a facility position on the road map, and guiding route display information to indicate a guiding route when the guiding route is settled. In this manner, the coordinate conversion process is not applied to the character display information and the mark display information. The three-dimensional road map can be displayed so that the user can easily view. At Step S60, the process displays the three-dimensional road map overlaid with various display information.

In this manner, the viewing angle for the three-dimensional road map can be changed based on the reference point in the three-dimensional road map. It becomes possible to change the display range of the three-dimensional road map while keeping the size of display contents near the reference point unchanged.

While there have been described specific preferred embodiments of the present invention, it is to be distinctly understood that the present invention is not limited thereto but may be otherwise variously embodied within the spirit and scope of the invention.

Figure 6A:
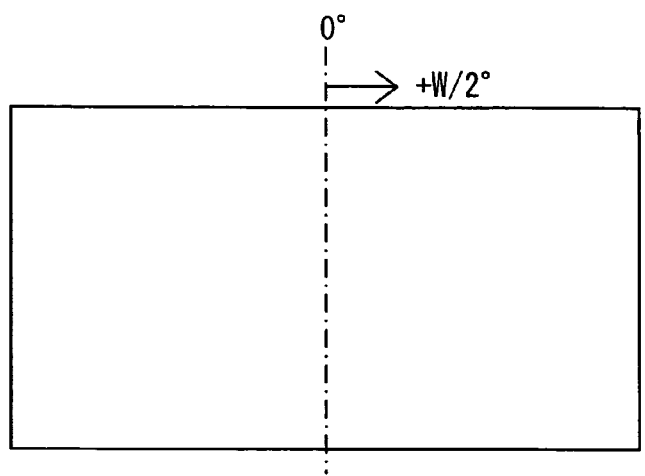
FIG. 6A or 6B diagramatically shows changing only the viewing angle for the three-dimensional road map to the right or left of the reference line (0°)
Figure 6B:
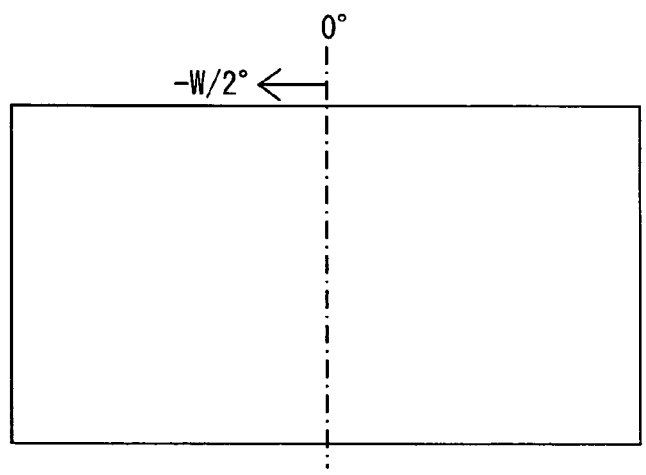

As shown in FIG. 3A, for example, the car navigation apparatus changes the horizontal viewing angle (W) for the three-dimensional road map on the screen based on the reference line (0°) that is drawn vertically on the screen and passes through the reference point. As shown in FIG. 6A or 6B, it may be preferable to change only the viewing angle for the three-dimensional road map to the right or left of the reference line (0°).

Figure 6C:
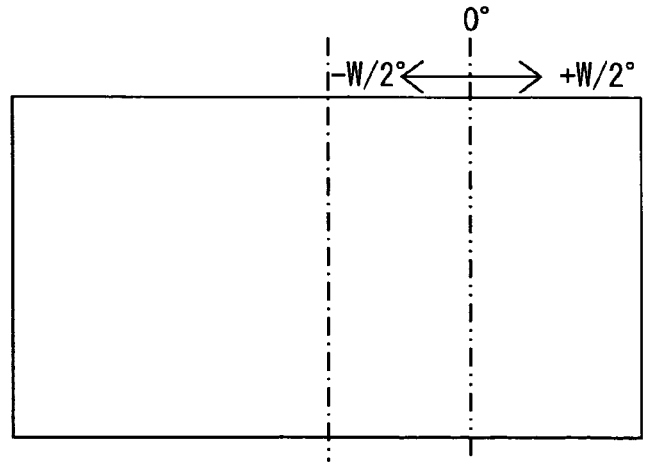
FIG. 6C diagramatically shows changing a position of setting the reference line (0°)

The position of the reference point may be changed vertically and horizontally on the screen. As a result, as shown in FIG. 6C, it is possible to horizontally change the position of the reference line (0°) that is drawn vertically on the screen and passes through the reference point. The viewing angle for the three-dimensional road map can be changed based on the right side of the screen.

Figure 7:
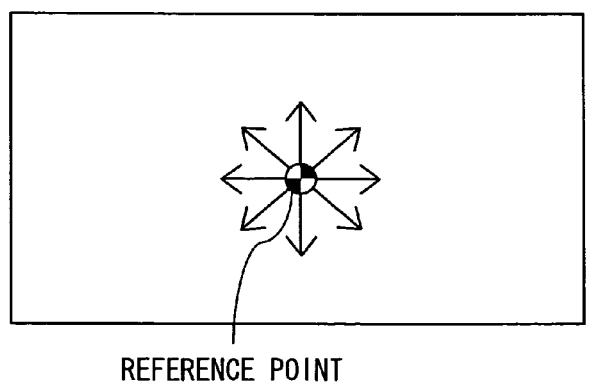
FIG. 7 diagramatically shows vertically and horizontally changing a viewing angle for the three-dimensional road map around a reference point.

While the embodiment changes the viewing angle horizontally on the screen, the viewing angle may be able to be changed not only horizontally, but also vertically on the screen. Accordingly, as shown in FIG. 7, the viewing angle for a three-dimensional road map can be vertically and horizontally on the screen based on the reference point.

In addition, the embodiment changes the viewing angle (W) according to attributes of a road assigned with the reference point. There may be provided communication means for communication with the outside of a vehicle as a mobile object. The communication means include: a VICS (Vehicle Information and Communication System) receiver that receives VICS information (about traffic congestion, accidents, and constructions) supplied from a VICS center through beacons installed along roads or local FM broadcasting stations; a mobile phone; a wireless LAN (Local Area Network); and a receiver to receive various airwaves. When the communication means is provided, the viewing angle for a three-dimensional road map may be changed in accordance with outside information acquired through the communication means.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A map display device mounted in a mobile object comprising:
    displayable range determination means for determining a displayable range of a road map based on a reference point, a viewpoint, and a viewing angle settled on the road map, wherein the viewpoint has a predetermined height defined by a length perpendicular to a plane including the displayable range, the viewing angle is configured to vary on the plane including the displayable range in a direction orthogonal to a virtual reference line between the viewpoint and the reference point while being centered on the virtual reference line between the viewpoint and the reference point;
    display control means for displaying a three-dimensional road map on a screen, the three-dimensional road map being generated by applying a coordinate conversion process to a road map belonging to the displayable range; and
    viewing angle change means for changing the viewing angle for the three-dimensional road map displayed on the screen based on the reference point with the predetermined height of the viewpoint unchanged wherein
    the reference point is settled on or near a certain road, which is at least one of (i) a road for a mobile object to be positioned and (ii) a road included in a route to a user-input destination,
    the viewing angle change means changes a viewing angle depending on a road attribute of the certain road,
    the viewing angle change means changes a viewing angle depending on a road type of the certain road, and
    a viewing angle for an expressway is smaller than a viewing angle for a general road.

2. The map display device according to claim 1, wherein the mobile object comprises a vehicle.

3. The map display device according to claim 2, wherein the map display device is configured as part of a navigation device mounted in the vehicle.

4. The map display device according to claim 1, further comprising:
    a global positioning satellite (GPS) receiver; and
    a position detection unit to calculate a current position using the GPS receiver, wherein
    the calculated current position is displayed on the three-dimensional road map displayed on the screen.

5. The map display device according to claim 1, further comprising:
    a map data storage unit configured to supply map data; and
    a display unit including the screen and configured to display a map based on the map data supplied from the map data storage unit, wherein
    the display unit displays the three-dimensional road map on the screen based on instructions received from the display control means.

6. The map display device according to claim 1, further comprising:
    a map data storage unit configured to supply map data, wherein
    the road attribute of the certain road is acquired from the map data storage unit.

7. the map display device according to claim 1, wherein the mobile object comprises a vehicle located on a road that is displayed on the three-dimensional road map on the screen.

8. The map display device according to claim 1, wherein the viewing angle and the viewpoint comprises a user view of the three-dimensional road map relative to a mobile object current position as determined by user control of the viewing angle change means.

9. A map display device mounted in a mobile object comprising:
    displayable range determination means for determining a displayable range of a road map based on a reference point, a viewpoint, and a viewing angle settled on the road map, wherein the viewpoint has a predetermined height defined by a length perpendicular to a plane including the displayable range, the viewing angle is configured to vary on the plane including the displayable range in a direction orthogonal to a virtual reference line between the viewpoint and the reference point while being centered on the virtual reference line between the viewpoint and the reference point;
    display control means for displaying a three-dimensional road map on a screen, the three-dimensional road map being generated by applying a coordinate conversion process to a road map belonging to the displayable range; and
    viewing angle change means for changing the viewing angle for the three-dimensional road map displayed on the screen based on the reference point with the predetermined height of the viewpoint unchanged, wherein
    the reference point is settled on or near a certain road, which is at least one of (i) a road for a mobile object to be positioned and (ii) a road included in a route to a user-input destination,
    the viewing angle change means changes a viewing angle depending on a road attribute of the certain road,
    the viewing angle change means changes a viewing angle depending on a road width of the certain road, and
    a viewing angle is increased as the road width increases.

10. A map display device mounted in a mobile object comprising:
    displayable range determination means for determining a displayable range of a road map based on a reference point, a viewpoint, and a viewing angle settled on the road map, wherein the viewpoint has a predetermined height defined by a length perpendicular to a plane including the displayable range, the viewing angle is configured to vary on the plane including the displayable range in a direction orthogonal to a virtual reference line between the viewpoint and the reference point while being centered on the virtual reference line between the viewpoint and the reference point:

display control means for displaying a three-dimensional road map on a screen, the three-dimensional road map being generated by applying a coordinate conversion process to a road map belonging to the displayable range; and viewing angle change means for changing the viewing angle for the three-dimensional road map displayed on the screen based on the reference point with the predetermined height of the viewpoint unchanged, wherein the reference point is settled on or near a certain road, which is at least one of (i) a road for a mobile object to be positioned and (ii) a road included in a route to a user-input destination, the viewing angle change means changes a viewing angle depending on a road attribute of the certain road, the viewing angle change means changes a viewing angle depending on a number of lanes included in the certain road, and a viewing angle is increased as the number of lanes increases.

* * * * *